United States Patent
Karner et al.

(10) Patent No.: US 8,376,399 B2
(45) Date of Patent: Feb. 19, 2013

(54) CONTROL UNIT AND METHOD FOR CONTROLLING OCCUPANT PROTECTION MEANS FOR A VEHICLE

(75) Inventors: Ruediger Karner, Kornwestheim (DE);
Hartmut Schumacher, Freiberg (DE);
Carsten List, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 12/736,042

(22) PCT Filed: Jan. 23, 2009

(86) PCT No.: PCT/EP2009/050750
§ 371 (c)(1),
(2), (4) Date: Dec. 13, 2010

(87) PCT Pub. No.: WO2009/109416
PCT Pub. Date: Sep. 11, 2009

(65) Prior Publication Data
US 2011/0074140 A1  Mar. 31, 2011

(30) Foreign Application Priority Data
Mar. 6, 2008 (DE) .......................... 10 2008 012 896

(51) Int. Cl.
*B60R 21/01* (2006.01)
(52) U.S. Cl. ............................. 280/735; 701/45; 340/428
(58) Field of Classification Search .................. 280/735; 701/45, 46, 49; 340/428, 438, 425.5
See application file for complete search history.

(56) References Cited

U.S. PATENT DOCUMENTS

| | | | |
|---|---|---|---|
| 5,648,739 A * | 7/1997 | Walther et al. | 327/330 |
| 6,072,676 A * | 6/2000 | Tran et al. | 361/56 |
| 6,125,313 A * | 9/2000 | Watanabe et al. | 701/45 |
| 6,529,356 B2 * | 3/2003 | Chin et al. | 361/84 |
| 7,110,232 B2 * | 9/2006 | Ausserlechner | 361/90 |
| 7,482,790 B2 * | 1/2009 | Eberlein | 323/270 |
| 7,831,361 B2 * | 11/2010 | Schumacher et al. | 701/45 |
| 2004/0196615 A1 | 10/2004 | Bennett et al. | |
| 2006/0145536 A1 * | 7/2006 | Hackl et al. | 307/10.1 |

FOREIGN PATENT DOCUMENTS

| | | |
|---|---|---|
| DE | 10 2004 060 296 | 6/2006 |
| WO | 01/81122 | 11/2001 |
| WO | 2007/003469 | 1/2007 |

* cited by examiner

*Primary Examiner* — Drew Brown
(74) *Attorney, Agent, or Firm* — Kenyon & Kenyon LLP

(57) ABSTRACT

A control unit and a method for triggering an occupant protection arrangement for a vehicle are described, at least two semiconductor modules being provided for actuating the triggering of the occupant protection arrangement. The at least two semiconductor modules are provided for actuating the control of the personal protective arrangement. The at least two semiconductor modules provide the power supply voltage for the control unit. The at least two semiconductor modules also monitor these power supply voltages and monitor each other in at least one direction relative to these power supply voltages. The at least two semiconductor modules jointly execute a reset for the control unit, depending on the monitoring of the power supply voltages.

10 Claims, 2 Drawing Sheets

CONTROL UNIT AND METHOD FOR CONTROLLING OCCUPANT PROTECTION MEANS FOR A VEHICLE

FIELD OF THE INVENTION

The present invention relates to a control unit and a method for triggering an occupant protection arrangement for a vehicle.

BACKGROUND INFORMATION

German patent document DE 10 2004 060 296 A1 discusses using at least two semiconductor modules, each having its own semiconductor support in a control unit for triggering an occupant protection arrangement. The modules' functions overlap.

SUMMARY OF THE INVENTION

The control unit and method according to the present invention for triggering an occupant protection arrangement for a vehicle having the features described herein have the advantage over the related art that now multiple semiconductor modules having similar or identical functions such as providing power supply voltages are present in a large number of ignition circuits, for example, and these modules execute a shared reset function for the control unit as a function of the monitoring of this power supply voltage. In other words, if all the power supply voltages have reached levels within a predefined range, the reset is enabled and the control unit is then able to work correctly with these power supply voltages. According to the exemplary embodiments and/or exemplary methods of the present invention it is provided that the at least two semiconductor modules monitor one another mutually with respect to the power supply voltages. This means that at least a portion of the supply of power supply voltages is monitored by the other semiconductor module. Thus, robust voltage monitoring and reset triggering are ensured in such a distributed power supply system. This is achieved in the present case by a cascaded circuit of self-monitoring power supply voltage among the various semiconductor modules. Individual monitoring, e.g., by a microcontroller, is therefore not necessary for semiconductor modules.

A control unit in the present case is an electrical device, which evaluates sensor signals and triggers the occupant protection arrangement such as air bags, seat-belt tighteners, an electronic stability program, or brakes as a function thereof. Triggering here means activation of the occupant protection arrangement.

Semiconductor modules are understood to be integrated circuits having their own semiconductor substrate. The at least two semiconductor modules may be situated in a shared housing.

Power supply voltages are to be understood primarily as voltages required by the control unit for operation. These include, for example, stabilized low voltages of 5 volt and 3.3 volt, which are used for the internal power supply to the semiconductor modules as well as for supplying the additional components of the control unit.

The monitoring function checks the available power supply voltages or generated voltages, from which the power supply voltages are ultimately derived, for the value range in which they are situated. If the power supply voltages are within a predefined range, then a functional capability of the particular semiconductor module with respect to supplying such power supply voltages is inferred. The monitoring function may be implemented by comparators as hardware and/or software, for example. In addition, the existing semiconductor modules are wired in a cascade with respect to this monitoring. In other words, the semiconductor modules detect at least one parameter (for example, a regulator output voltage) of the other semiconductor module with respect to generating the power supply voltages. The monitoring may be mutual or only unilateral, i.e., monitoring takes place in only one direction.

A reset function is understood in the present case to be generation of a reset signal for the modules in the control unit. As explained above, this reset is enabled (a high level, for example) when the power supply voltages are within the predefined parameters and are activated thereafter when there are disturbances in operation or after a shutdown of the device (a low level, for example). The reset produces a state of the modules that has been predefined. The reset function is activated when the power supply voltages are not within the predefined parameters.

"Reset active" means that an error state and/or a lack of power supply had been detected and the device is blocked, i.e., there is no trigger functionality.

"Reset enabled" is the normal state after "power on" in which all internal voltages are within the expected range and there is full functionality of the control unit and its components. In the present case the reset is low active, i.e., high level 3.3 V=reset enabled; low level=reset active.

Advantageous improvements of the control unit described herein and the method for triggering the occupant protection arrangement for a vehicle are possible through the measures and refinements further described herein.

It is advantageous here that the particular monitoring function monitors at least one output voltage of the linear regulator of the other semiconductor module. Maintaining a defined band voltage limit (minimum and maximum) or a minimum voltage limit is checked here. A linear regulator is an essential module for generating the power supply voltages.

It is also advantageous that the reset function has at least one current source for delivering at least two currents. The reset activate or reset enable actions may thus be coded by different currents. The currents may differ by a factor of at least two; the current for activation of the reset is higher than the second current for enabling the reset. Thus, in a plurality of semiconductor modules, the current for activation of the reset may prevent a wrong decision by other semiconductor modules. It has proven especially advantageous here to set the first current at least 2 mA and the second current at maximal 1 mA. In another variant it has proven advantageous to set the first current at least 4 mA. The current for activating the reset is thus given as at least 2 mA and the current for enabling the reset is thus given as maximal 1 mA.

The joint reset for the entire system of resets of various semiconductor modules may be formed either by a direct interconnection or by an additional evaluation logic unit (for example, various microcontroller ports).

For example, if there are three semiconductor modules whose reset outputs are directly linked, then all the individual modules must enable their resets for enabling the overall reset. Otherwise the triggering of a reset-activating current source in a semiconductor module ensures that the overall reset is activated.

Exemplary embodiments of the present invention are depicted in the drawing and explained in greater detail in the following description.

DETAILED DESCRIPTION

Figure 1:
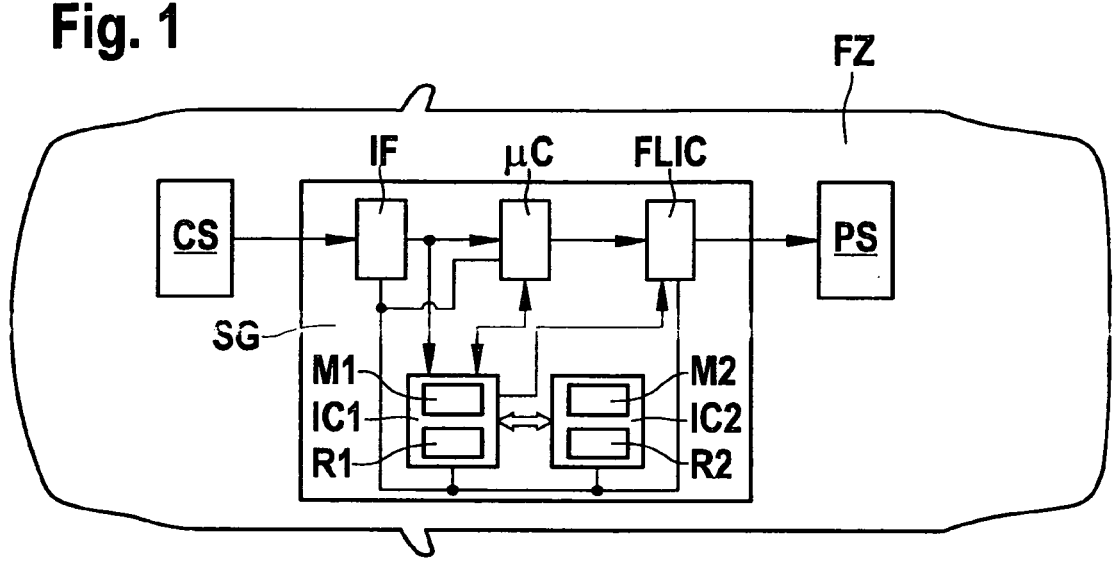
FIG. 1 shows a block diagram of the control unit according to the present invention in a vehicle having connected components.

FIG. 1 shows a block diagram of control unit SG according to the exemplary embodiments and/or exemplary methods of the present invention in a vehicle FZ having a crash sensor system CS and an occupant protection arrangement PS as connected components. A simplified diagram has been selected in the present case; even more components than those shown here are necessary for actual operation, but these components have been omitted for the sake of simplicity.

Crash sensor system CS is connected to an interface IF in control unit SG. Crash sensor system CS includes, for example, acceleration sensors, air pressure sensors, structure-borne sound sensors and environmental sensors. Signals are transmitted to interface IF via a bus or point-to-point connections, for example. Current modulation is generally used. Many of the sensors such as acceleration sensors, structure-borne sound sensors and air pressure sensors are manufactured as micromechanical components and are therefore easily manufactured in large numbers.

Interface IF is designed as an integrated circuit in the present case. It is possible to implement it from a plurality of integrated circuits in combination with discrete components and/or in combination with software. Interface IF receives signals from crash sensor system CS and reformats them for a simple protocol for the control unit. The SPI bus is generally used for transmission of these signals. The signals are transmitted from interface IF to microcontroller pC as the evaluation circuit and to IC1. Instead of a microcontroller, other types of processors, ASICs and/or discrete components may also be used. Peripheral components such as memories, etc., are not shown for the sake of simplicity. Microcontroller µC evaluates the sensor signals by using evaluation algorithms which have been loaded and generates a trigger signal depending on the result of this evaluation. Semiconductor module IC1 also receives the sensor signals in parallel. For evaluating these sensor signals, IC1 also has an electronic evaluator, which evaluates the sensor signals in a simple manner and transmits a corresponding enable signal to ignition circuit FLIC.

However, module IC1 also performs watchdog functions, for example. In addition, semiconductor module IC1 supplies the power supply voltage according to the exemplary embodiments and/or exemplary methods of the present invention. This is also performed by additional semiconductor module IC2. Semiconductor modules IC1 and IC2 supply 3.3 volt and 5 volt as the power supply voltages, for example. Semiconductor modules IC1 and IC2 also each have monitor functions M1 and M2, which check the generated power supply voltages for maintaining certain values. Therefore, comparators are implemented in the hardware or software. Furthermore, semiconductor modules IC1 and IC2 have a reset function R1 and R2, which is activated by semiconductor modules IC1 and IC2 when the power supply voltages are not within predefined parameters. The other components of the control unit may then be reset to bring them to a defined state.

These reset functions R1 and R2 are combined directly or via a logic and are connected to all components of the control unit to activate a reset when the power supply voltages are not within predefined parameters or to enable the reset when the power supply voltages are correct. The enable occurs after a power-up to enable operation of control unit SG.

Ignition circuit FLIC has electrically controllable power switches, which are triggered as a function of the signals of microcontroller µC and additional relevant signals. Two power switches are generally used per ignition circuit, but it is also possible to use more than these two power switches. Redundant analysis by microcontroller µC and semiconductor module IC1 is important.

Figure 2:
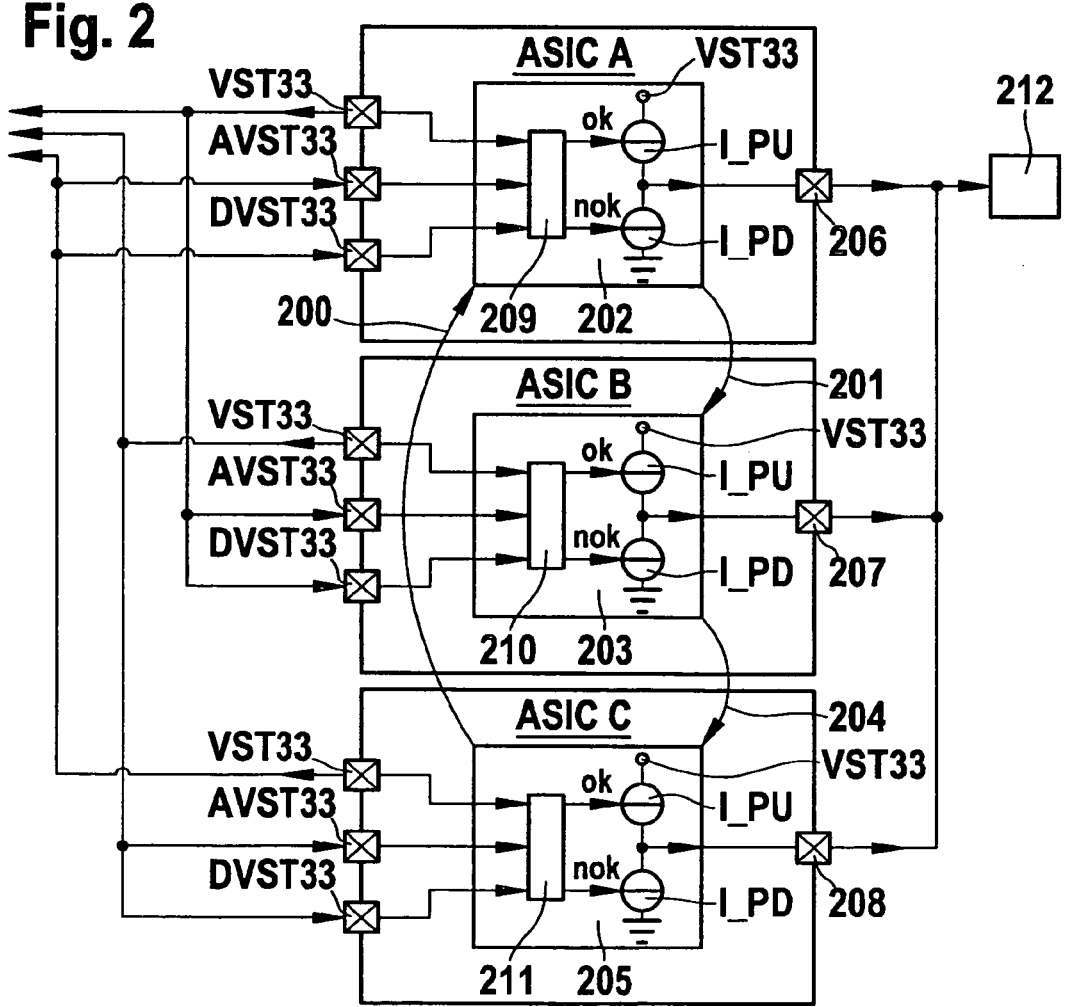
FIG. 2 shows a wiring diagram of three semiconductor modules wired together according to the present invention.

FIG. 2 shows a block diagram of three semiconductor modules ASIC A, B and C interconnected according to the present invention. Three ASICs A, B and C provide multiple power supply voltages. One of these voltages is VST33, which provides 3.3 V for the internal power supply of the semiconductor modules and all other system components. For the internal power supply of ASICs A, B and C, voltage VST33 is sent back to them after possible filtering (via external components) as AVST33 (power supply to analog circuit parts) and DVST33 (digital power supply). Output voltage VST33 as well as input voltages AVST33 and DVST33 are monitored in the ASIC-internal reset generator. To allow mutual monitoring of the ASICs, the AVST33 and DVST33 power supplies are in cascaded form (partially or completely). Output signal VST33 of ASIC C is sent to inputs AVST33 and DVST33 of ASIC A. The output signal of ASIC A VST33 goes similarly to inputs AVST33 and DVST33 of ASIC B. The output signal of ASIC B then in turn goes to the two inputs of ASIC C. The signals are linked together and evaluated in blocks 209, 210 and 211 of reset generators 202, 203 and 205. The current source using which the reset current is output is selected as a function thereof. In addition, other ASIC-internal signals are also used for the reset decision.

The evaluation in blocks 209, 210 and 211 is performed by comparators. If at least one of the voltages is not in order, pull-down current source I_PD, as it is characterized in all three reset generators 202, 203 and 205, is selected. If the voltages are in order, upper pull-up source I_PU is selected. The current of current source I_PU ensures that the reset is enabled. It has 1 mA for this purpose, for example. The current of current source I PD ensures that the reset function is activated via outputs 206, 207 and 208. As soon as one of ASICs A, B and C supplies the current of respective current source I_PD, the components in the control unit are reset or the corresponding response occurs, depending on the presence and type of logic block 212. If all ASICs A, B and C supply the current of respective current source I_PU, the reset is enabled. The mutual monitoring is represented by arrows 200, 201, 204.

Figure 3:
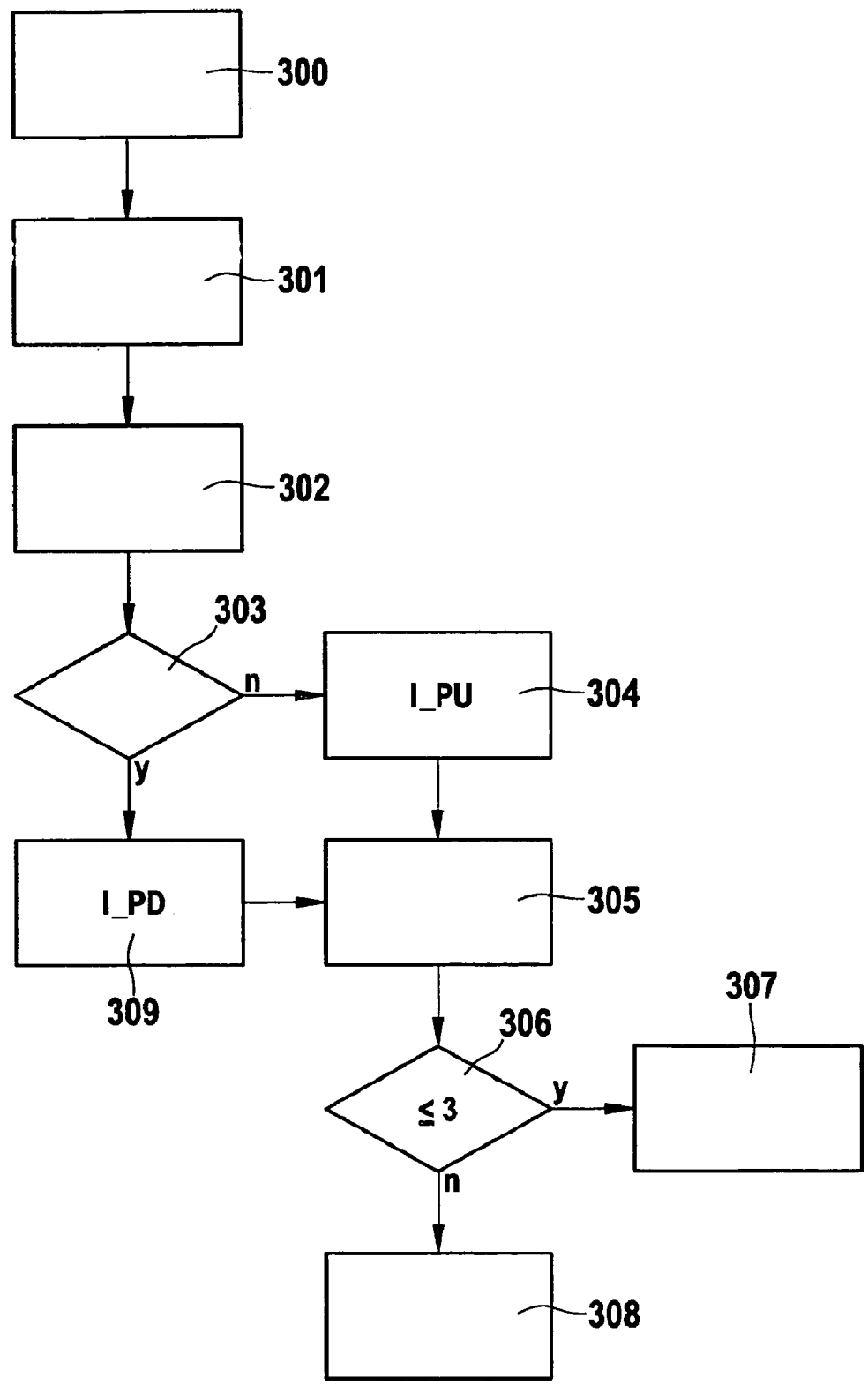
FIG. 3 shows a flow chart of the method according to the present invention.

FIG. 3 illustrates the method according to the present invention in a flow chart. In method step 300, the power supply voltages are generated from the battery voltage by semiconductor modules ASICs A, B and C. In method step 301, the internal power supply voltages are monitored by comparators, and in method step 302 the monitoring of the external linear regulator, i.e., the output voltage of one of the other ASICs, is performed as shown in FIG. 2. In method 303 there is a check as to whether only one of the power supply voltages is not in order. If that is the case, then current I_PD from at least one ASIC is selected in method step 309, and is added to other currents output by other ASICs in method step 305. However, if it has been found in method step 303 that the voltages are in order, then in method step 304 the current of respective current source I_PD is selected. In method step 305 the currents of the individual semiconductor modules are added up, e.g., according to FIG. 2, to then be checked in method step 306 for whether they are below a certain limit. This limit is normally 0 mA, i.e., positive currents always mean a current supplied by the ASIC from 3.3 V (PU), i.e., there follows a reset enable. Negative currents mean currents flowing into the ASIC to ground GND (PD), i.e., a reset activation. If it is the case that the sum of currents is below the limit, then in method step 307 the component reset is performed in the control unit. If this is not the case, the method ends in method step 308.

What is claimed is:

1. A control unit for triggering an occupant protection arrangement for a vehicle, comprising:
   at least two semiconductor modules, which cause the triggering of the occupant protection arrangement, wherein each of the at least two semiconductor modules include:
      a power supply arrangement to provide a power supply voltage for the control unit,
      a monitoring function arrangement to monitor the power supply voltage, wherein the at least two semiconductor modules monitor one another in at least one direction also with respect to the power supply voltages via the particular monitoring function; and
   wherein the at least two semiconductor modules have a joint reset function for the control unit, which is activated as a function of output signals of the monitoring function.

2. The control unit of claim 1, wherein the particular monitoring function monitors at least one linear regulator of the other semiconductor module with respect to the power supply voltages.

3. The control unit of claim 1, wherein the reset function has at least one current source for delivering at least two currents.

4. The control unit of claim 3, wherein the at least two currents differ by a factor of at least two, and wherein a first current for activation of the reset is higher than a second current for enabling the reset.

5. The control unit of claim 4, wherein the first current is 2 mA and the second current is 1 mA.

6. A method for triggering an occupant protection arrangement for a vehicle having at least two semiconductor modules, which cause the triggering, the method comprising:
   providing, using the at least two semiconductor modules, power supply voltages for a control unit;
   monitoring, using the at least two semiconductor modules, the power supply voltages, wherein the at least two semiconductor modules monitor one another in at least one direction with regard to the power supply voltage; and
   jointly performing a reset for the control unit by the at least two semiconductor modules as a function of the monitoring of the power supply voltages.

7. The method of claim 6, wherein the at least two semiconductor modules monitor one another with respect to the power supply voltages by at least one linear regulator monitoring the other particular semiconductor module.

8. The method of claim 6, wherein at least one current source supplies at least two currents for the reset.

9. The method of claim 6, wherein the at least two currents differ by a factor of two, and wherein a first current for blocking the reset is higher than a second current for enabling the reset.

10. The method of claim 9, wherein 2 mA is used as the first current and 1 mA is used as the second current.

* * * * *

UNITED STATES PATENT AND TRADEMARK OFFICE
CERTIFICATE OF CORRECTION

PATENT NO.        : 8,376,399 B2                               Page 1 of 1
APPLICATION NO. : 12/736042
DATED             : February 19, 2013
INVENTOR(S)       : Karner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 246 days.

Signed and Sealed this
First Day of September, 2015

Michelle K. Lee
*Director of the United States Patent and Trademark Office*